(12) United States Patent
Shiono et al.

(10) Patent No.: US 6,422,767 B1
(45) Date of Patent: Jul. 23, 2002

(54) CAMERA HAVING GROOVES FOR SMOOTH MOVEMENT OF SLIDABLE LENS BARRIER

(75) Inventors: Junji Shiono, Yokohama; Tatsuya Suzuki, Tokyo, both of (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/575,010

(22) Filed: May 23, 2000

(30) Foreign Application Priority Data

May 26, 1999 (JP) .......................................... 11-147086

(51) Int. Cl.[7] .............................................. G03B 17/00
(52) U.S. Cl. ...................... 396/448; 396/349; 396/535
(58) Field of Search ............................... 396/349, 448, 396/535

(56) References Cited

U.S. PATENT DOCUMENTS 6,036,376 A * 3/2000 Owashi et al. .............. 396/349

FOREIGN PATENT DOCUMENTS

JP           58163938        9/1983
JP           58-163938     * 11/1983

* cited by examiner

*Primary Examiner*—Russell Adams
*Assistant Examiner*—Arthur A Smith
(74) *Attorney, Agent, or Firm*—Ostrolenk, Faber, Gerb & Soffen, LLP (57) ABSTRACT

In the camera of the present invention, first cam grooves and second cam grooves which are branched from the middle portions of the first cam grooves and have a width narrower than a width of the first cam grooves are provided on a camera body. First cam followers having a diameter which corresponds to the cam width of the first cam grooves and second cam followers having a narrow diameter which corresponds to the cam width of the second cam grooves are provided on a slide barrier. At the time of moving the slide barrier from an opened position where the slide barrier is opened to a closed position where the slide barrier covers a picture taking lens, the first cam followers are prevented from entering or intruding into the second cam grooves having the narrow width and thus carry out the sliding movement along the first cam grooves.

20 Claims, 4 Drawing Sheets

CAMERA HAVING GROOVES FOR SMOOTH MOVEMENT OF SLIDABLE LENS BARRIER

This application claims benefit of Japanese Application No. H11-147086 filed in Japan on May 26, 1999, the contents of which are incorporated by this reference.

BACKGROUND OF THE INVENTION

1. Field of the Invention

This invention relates to a camera provided with a barrier, and more particularly to a camera provided with a barrier which covers a picture-taking lens.

2. Related Art Statement

Recently, in the field of compact cameras, to satisfy demands on contours or design while taking into account the protection of picture-taking lenses and the portability of cameras, cameras which cover the front faces of these picture-taking lenses by means of slide-type barriers with retractable lens barrels in camera bodies have been commercialized.

With respect to the cameras provided with these slide barrier mechanisms, from the viewpoint of design, it is desirable that the surface of the slide barrier and the front surface of the camera body become approximately coplanar when the slide barrier is closed so as to cover the picture-taking lens.

Japanese Laid-Open Patent Publication 163938/1983 discloses a camera which takes such a viewpoint into consideration. In this camera, on upper and lower portions of a front surface of a camera body, cam grooves which are composed of a groove which perpendicularly intersects an optical axis direction of the picture-taking lens (a perpendicularly intersecting groove) and two grooves which are bent in the optical axis direction relative to the perpendicularly intersecting groove (the groove at the distal end side constituting a first optical axis groove and the groove branched from the middle portion of the perpendicularly intersecting groove constituting a second optical axis groove) are disposed. Further, the camera is provided with a slide barrier which slides along these cam grooves. On the upper and lower portions of the slide barrier, two pins which are slidably fitted into the cam grooves are respectively provided. That is, four grooves in total are provided on the upper and lower portions of the slide barrier.

These two pins (the pin disposed at a position close to the center constituting the first pin and the pin disposed close to the side constituting the second pin when the slide barrier is held in the opened position) are disposed corresponding to the above-mentioned two optical axis grooves (the first and second grooves). Then, at the time of closing the slide barrier, the first and second pins are moved from the perpendicularly intersecting groove to the first and second optical axis grooves. As a result, the slide barrier is moved toward the rear portion of the camera so as to make the front surface of the slide barrier substantially coplanar with the front surface of the camera body.

In the camera disposed in Japanese Laid-Open Patent Publication 163938/1983, it is basically intended that, at the time of closing the slide barrier, the first pin which is disposed close to the center moves to the distal-end-side first optical axis groove and the second pin which is disposed close to the side moves to the branched second optical axis groove. However, in case a gap between wall portions of the camera which guide the slide barrier and the slide barrier itself is large, in the course of the movement of the slide barrier, the first pin enters the branched second optical axis groove which is disposed ahead of the first axis groove and hence, it gives rise to a problem in which the slide barrier cannot be closed smoothly, thus deteriorating the usability of the camera.

OBJECTS AND SUMMARY OF THE INVENTION

It is the first object of the present invention to provide a camera having a barrier of simple constitution and yet having a favorable usability.

It is the second object of the present invention to provide a camera which ensures a smooth operation in opening or closing the slide barrier by skillfully determining the width of a plurality of cam grooves and the diameter of cam followers which are engaged with these grooves.

In summary, with respect to the camera of the present invention, a first cam groove and a second cam groove which is branched from the middle portion of the first cam groove and has a width narrower than a width of the first cam groove are provided on a camera body, a first cam follower having a diameter which corresponds to the width of the first cam groove and a second cam follower having a narrow diameter which corresponds to the width of the second cam groove are provided on a slide barrier, and at the time of moving the slide barrier from an opened position to a closed position at which the slide barrier covers a picture-taking lens, the first cam follower is prevented from entering or intruding into the second cam groove having the narrow width and to thus slide smoothly along the first cam groove.

These objects and advantages of the present invention will become further apparent from the following detailed explanation.

DETAILED DESCRIPTION OF THE PREFERRED EMBODIMENTS

An embodiment of the present invention is explained hereinafter in conjunction with the attached drawings.

Figure 1:
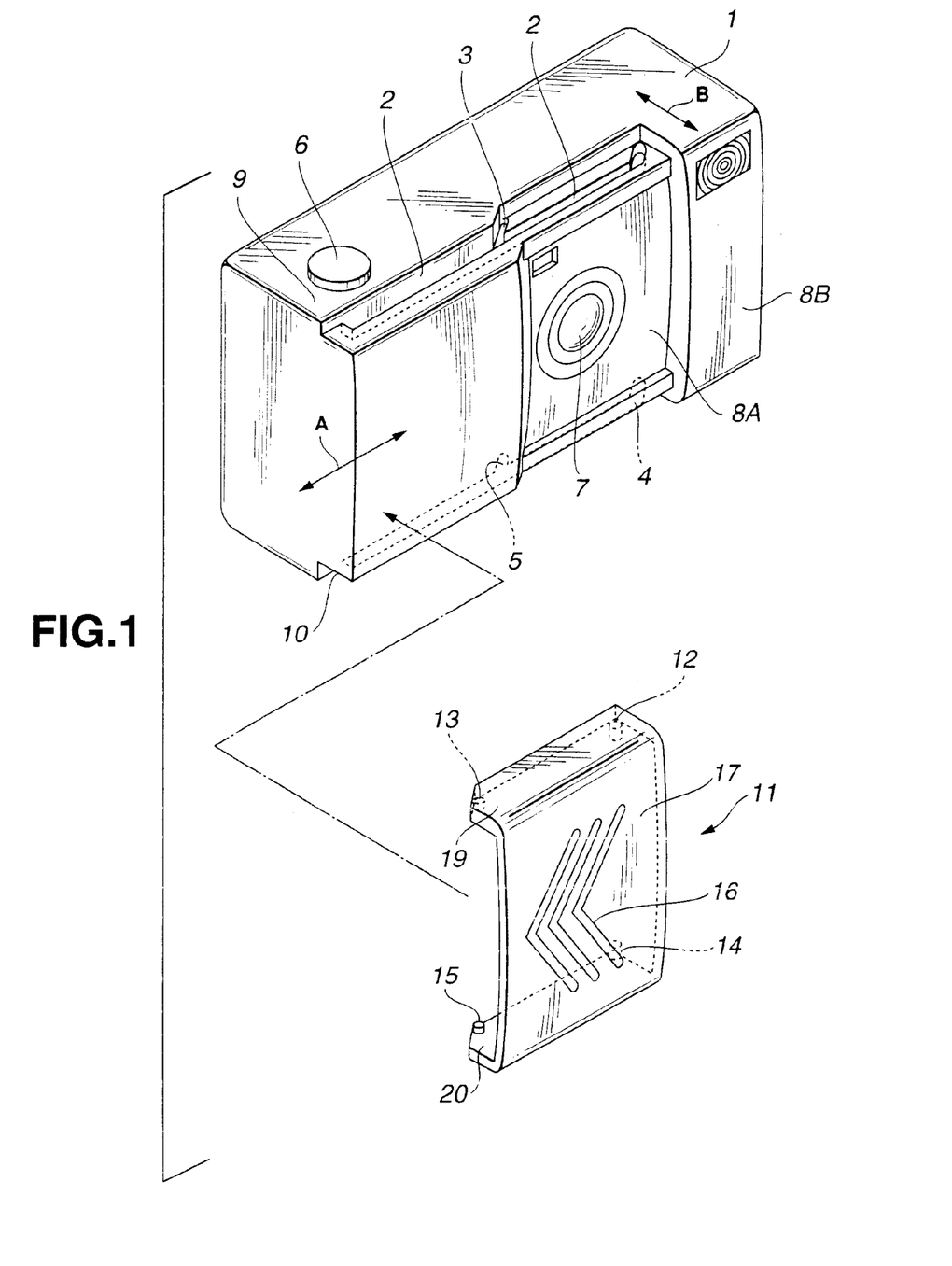
FIG. 1 is an exploded assembly view showing a camera of one embodiment of the present invention in which a camera body is separated from a slide barrier which covers a picture-taking lens.
Figure 2:
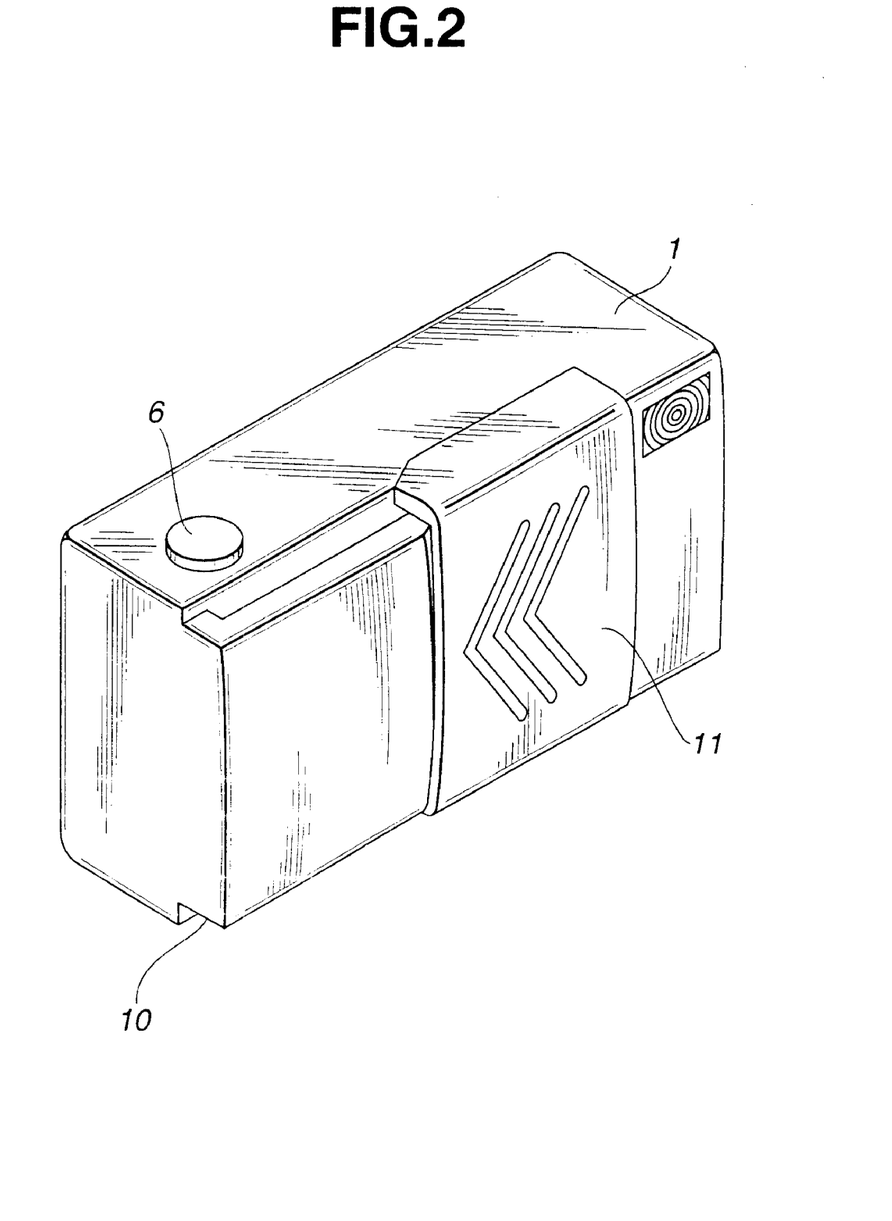
FIG. 2 is a perspective view showing the camera of the above-mentioned embodiment with the slide barrier in the closed condition after incorporating the slide barrier onto the camera body.
Figure 3:
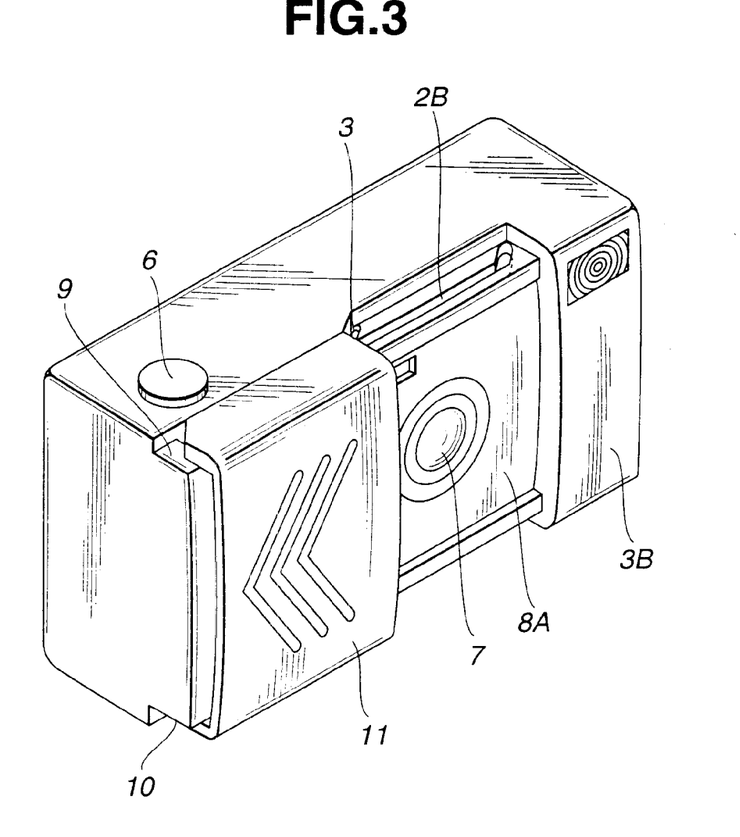
FIG. 3 is a perspective view showing the camera of the above-mentioned embodiment with the slide barrier in the opened condition after incorporating the slide barrier onto the camera body.

FIG. 1 is an exploded assembly view showing a camera of one embodiment of the present invention in which a camera body and a slide barrier which covers a picture-taking lens are separated from each other, FIG. 2 is a perspective view showing the above-mentioned camera with the slide barrier in the closed condition after incorporating the slide barrier onto the camera body, and FIG. 3 is a perspective view showing the above-mentioned camera with the slide barrier in the opened condition after incorporating the slide barrier onto the camera body.

The camera is comprised of a camera body 1 and a slide barrier 11. The slide barrier 11 is a barrier which covers a picture-taking lens 7 incorporated into the camera body 1 and is slidably disposed in the directions of the directional components indicated by arrows A and B in the drawing on a front surface of the camera body 1. In FIG. 1, although the slide barrier 11 is shown at a position apart from the camera body 1, the slide barrier 11 is preferably designed to be not removable from the camera body 1 once it is incorporated onto the camera body 1 as will be explained later.

The constitution of the camera body 1 and the slide barrier 11 is explained hereinafter in conjunction with the attached drawings.

The camera includes a normal photography function and a picture-taking lens 7 which can be accommodated in the camera body 1 and disposed at an approximately central portion of the front surface of the camera body 1. This picture-taking lens 7 has a lens barrel which is protruded from the camera body 1 at the time of taking pictures and is retracted into and accommodated in the camera body 1 at the time of storing the camera. Since this protruding and retracting mechanism is a known structure, an explanation thereof is omitted here.

In a central front surface 8A of the camera body 1 where the picture-taking lens 7 is disposed, a recessed portion which is shifted slightly left from the optical axis and between the side front surfaces 8B of the camera body 1 is formed. At the time of accommodating the picture-taking lens 7 upon retraction thereof, the picture-taking lens 7 is accommodated in the inside of the camera body 1 without protruding from this central front surface 8A. At the time of closing the slide barrier 11, the slide barrier 11 is disposed in the recessed portion, wherein the front surface of the slide barrier 11 becomes approximately coplanar with both the side front surfaces 8B of the camera body 1 (see FIG. 2).

Further, stepped surfaces 9, 10 are respectively formed on the front-face-side upper and lower surfaces of the camera body 1, wherein the stepped surfaces 9, 10 extend from one side (left side in FIG. 1) to the central portion of the camera body 1. These stepped portions 9, 10 have portions thereof which correspond to the central front surface 8A, which is formed more deeply rearwardly, to accommodate the closed condition of the slide barrier 11 (see FIG. 2).

In the stepped surface 9, a first cam groove 2 is formed consisting of a groove which allows the slide barrier 11 to move in the direction (see the arrow A in the drawing) which traverses the optical axis of the picture-taking lens 7 and a groove which is bent toward the rear portion of the camera body 1 at the distal end portion (toward the right side of FIG. 1) of the former groove, and a second cam groove 3 is branched from the middle portion of the first cam groove 2 and extends toward the rear portion of the camera body 1.

The first cam groove 2 is disposed along a straight line from one side of the camera body 1 (the left in FIG. 1) toward the right side and is bent toward the rear portion of the camera body at the distal end thereof. The straight-line groove and the bent distal end portion have the same width and the width corresponds to the diameter of the first cam follower 12 which will be described later.

The second cam groove 3 is branched from the middle portion of the straight-line groove of the first cam groove 2 and extends toward the rear portion of the camera body 1 parallel to the distal end portion of the first cam groove 2. The width of the second cam groove 3 is narrower than the width of the first cam groove 2 and corresponds to the diameter of a second cam follower 13 which will be described later.

On the other hand, on the stepped surface 10 formed on the bottom surface of the camera body 1, a third cam groove 4 and a fourth cam groove 5 which respectively form pairs with the first cam groove 2 and the second cam groove 3 are formed. The third cam groove 4 and fourth cam groove 5 are disposed symmetrically with the first cam groove 2 and the second cam groove 3 with respect to the camera body 1 which is sandwiched therebetween. Further, the width relationship between the third cam groove 4 and the fourth cam groove 5 is equal to the width relationship between the first cam groove 2 and the second cam groove 3. That is, the width of the fourth cam groove 5 is narrower than the width of the third cam groove 4. The widths of the third cam groove 4 and the fourth cam groove 5 correspond to the diameters of the third cam follower 14 and the fourth cam follower 15, respectively.

In the description of this embodiment, the first cam groove 2 and the third cam groove 4 constitutes "a pair of first cam grooves" formed in the camera body 1 and the second cam groove 3 and the fourth cam groove 5 constitutes "a pair of second cam grooves" formed in the camera body 1 which have a width narrower than the width of the first pair of cam grooves. Further, the first cam follower 12 and the third cam follower 14 which will be described later constitute "a pair of first cam followers" formed on the slide barrier 11 and the second cam follower 13 and the fourth cam follower 15 which will be described later constitute "a pair of second cam followers" formed on the slide barrier 11 and having a diameter narrower than the first cam followers.

As shown in FIG. 1, a release button 6 is provided on an upper surface of the left side portion of the camera body 1.

The slide barrier 11 which slides while being engaged with the first cam groove 2, the second cam groove 3, the third cam groove 4 and the fourth cam groove 5 is incorporated into the camera body 1. As shown in FIG. 1, slide portions 19, 20 are extended from upper and lower portions of a barrier body 17 which covers the picture-taking lens 7 thus providing an approximately laterally U-shaped longitudinal cross section to the slide barrier 11. Upon incorporating the slide portions 19, 20 onto the camera body 1, they are slidable relative to the stepped surfaces 9, 10 while facing them in an opposed manner.

In the slide portion 19, the column-like first cam follower 12 which can be fitted into and is capable of coming into slidable contact with the first cam groove 2 formed in the camera body 1 is protruded from one side of a surface which faces the stepped surface 9 in an opposed manner, while the column-like second cam follower 13 which can be fitted into and is capable of coming into slidable contact with the second cam groove 3 formed in the camera body 1 is protruded from the other side of the above-mentioned surface. The diameter of the second cam follower 13 is narrower than the diameter of the first cam follower 12 and corresponds with the width of the second cam groove 3.

On the other hand, on the slide portion 20, the column-like third cam follower 14 which can be fitted into and is capable of coming into slidable contact with the third cam groove 4 formed in the camera body 1 is protruded from one side of a surface which faces the stepped surface 10 in an opposed manner, while the column-like fourth cam follower 15 which can be fitted into and is capable of coming into slidable contact with the fourth cam groove 5 formed in the camera body 1 is protruded from the other side of the above-mentioned surface. The diameter of the fourth cam follower 15 is narrower than the diameter of the third cam follower 14 and corresponds with the width of the fourth cam groove 5.

The slide barrier 11 is formed of a material such as a resin and accordingly has a resilient property. In incorporating the slide barrier 11 onto the camera body 1 as shown in FIG. 2 and FIG. 3, the slide portions 19, 20 are slightly opened and the first cam follower 12, the second cam follower 13, the third cam follower 14 and the fourth cam follower 15 are respectively engaged with the first cam groove 2 and the third cam groove 4.

Further, the positional relationship between respective cam followers at the time of closing the slide barrier 11 is such that the first follower 12, the second cam follower 13, the third cam follower 14 and the fourth cam follower 15 are respectively positioned at the distal ends of the first cam groove 2, the second cam groove 3, and the third cam groove 4 and the fourth cam groove 5. This positional relationship is explained in detail later.

As shown in FIG. 1, on a front-side surface of the slide barrier 11, a hooking portion 16 which facilitates the sliding of the slide barrier 11 is formed. This hooking portion 16 may be formed in a stripe pattern in either a protruding form or a recessed form.

Subsequently, the manner of operation of the slide barrier 11 of the camera of this embodiment having the above-mentioned constitution is explained in conjunction with FIG. 4 to FIG. 7.

Figure 4:
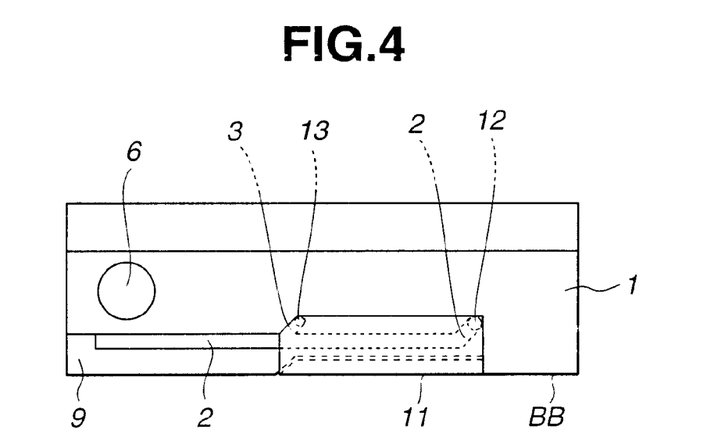
FIG. 4 is a plan view of the camera of the above-mentioned embodiment showing the slide barrier in the closed condition.
Figure 5:
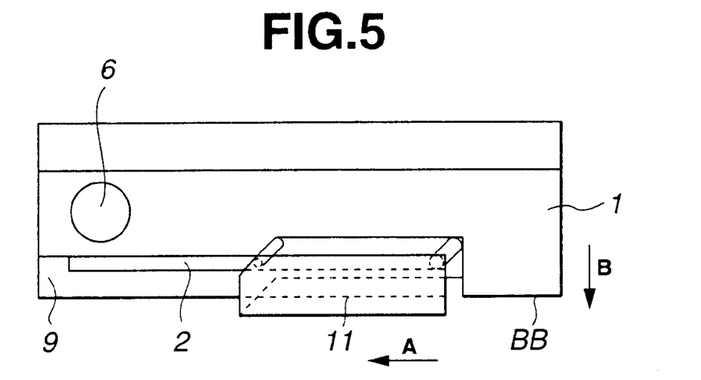
FIG. 5 is a plan view of the camera of the above-mentioned embodiment showing the slide barrier in the condition where the slide barrier is slightly moved from the condition shown in FIG. 4.
Figure 6:
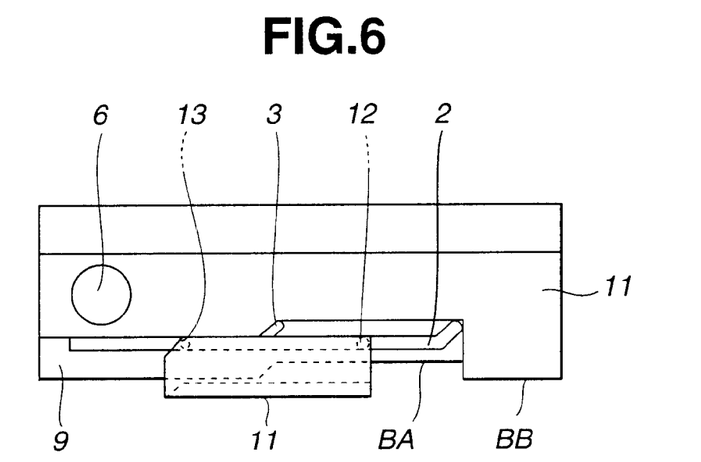
FIG. 6 is a plan view of the camera of the above-mentioned embodiment showing the slide barrier in a condition where the slide barrier is further moved from the condition shown in FIG. 5.
Figure 7:
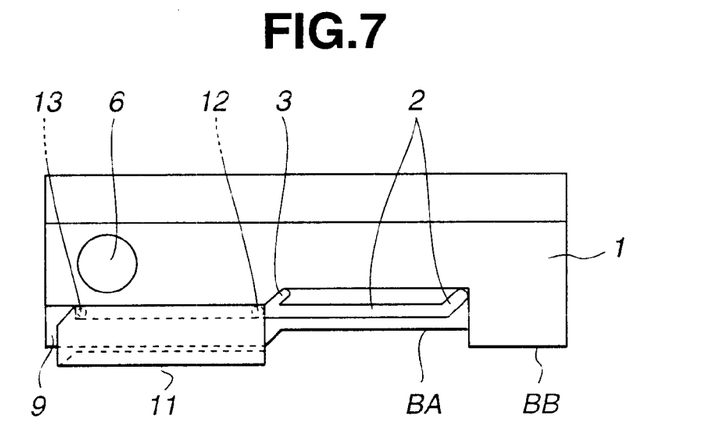
FIG. 7 is a plan view of the camera of the above-mentioned embodiment showing the slide barrier in the fully opened condition.

FIG. 4, FIG. 5, FIG. 6 and FIG. 7 are plan views of the camera of this embodiment, wherein FIG. 4 shows the condition where the slide barrier 11 is closed, FIG. 5 shows the condition where the slide barrier 11 is slightly moved from the condition shown in FIG. 4, FIG. 6 shows the condition where the slide barrier 11 is further moved from the condition shown in FIG. 5, and FIG. 7 shows the condition where the slide barrier 11 is fully opened.

When the slide barrier 11 is closed after incorporating the slide barrier 11 onto the camera body 1, the slide barrier 11 is disposed at the position shown in FIG. 4 so as to cover the picture-taking lens 7. Here, the first cam follower 12 and the second cam follower 13 are respectively positioned at the distal end portions of the first cam groove 2 and the second cam groove 3. Although not shown in the drawing, on the lower side of the camera, the third cam follower 14 and the fourth cam follower 15 are respectively positioned at the distal end portions of the third cam groove 4 and the fourth cam groove 5.

Further, when the slide barrier 11 is closed, the front surface of the slide barrier 11 is substantially coplanar with the front surfaces 8B of both the side portions of the camera body 1.

When the user applies a force to the slide barrier 11 in the leftward direction so as to open the slide barrier 11, as shown in FIG. 5, the first cam follower 12 and the second cam follower 13 move along the distal end portion of the first cam groove 2 and the second cam groove 3 in the optical axis direction (see the arrow B) as well as in the direction which traverses the optical axis direction (see the arrow A).

Although not shown in the drawing, the third cam follower 14 and the fourth cam follower 15 perform the similar function in the cam grooves with which they are respectively engaged.

Due to such construction, the slide barrier 11 is moved toward the front portion of the camera body 1 as well as in the direction to open the slide barrier 11.

When the user applies a force to the slide barrier 11 so as to move the slide barrier in the further leftward direction from the condition shown in FIG. 5, both of the first cam follower 12 and the second cam follower 13 move along the straight line groove of the first cam groove 2 in the direction of arrow A (see FIG. 6). In the same manner, both of the third cam follower 14 and the fourth cam follower 15 move along the straight line groove of the third cam groove 4 in the direction of arrow A.

Here, the camera-front-side portion of the column peripheral surface of the second cam follower 13 and the camera-front-side side wall of the first cam groove 2 are held in the condition where they are brought into slidable contact with each other. The fourth cam follower 15 and the third cam groove 4 are also held in the same relationship.

When the slide barrier 11 is further moved in the leftward direction, the second cam follower 13 and the fourth cam follower 15 respectively come into contact with end portions of the first cam groove 2 and the third cam groove 4 and the slide barrier 11 is moved to the fully opened condition. FIG. 7 shows this condition, that is, the fully opened condition of the slide barrier 11.

To close the slide door 11 from this fully opened condition (the condition shown in FIG. 7), the user manipulates the hooking portion 16 or the like so that the slide barrier 11 is moved in the rightward direction. In the course of this movement, since the diameter of the first cam follower 12 is larger than the width of the second cam groove 3, the first cam follower 12 is prevented from entering or intruding into the second cam groove 3 and thus moves smoothly along the straight line groove of the first cam groove 2. In the same manner, although not shown in the drawing, the third cam follower 14 is also prevented from entering or intruding into the fourth cam groove 5 and thus moves naturally along the straight line groove of the third cam groove 4.

When the slide barrier 11 is further moved from the condition shown in FIG. 6 to FIG. 5 and then from FIG. 5 to FIG. 4, the first cam follower 12 and the second cam follower 13 respectively slidably move along the distal end portion of the first cam groove 2 and the second cam groove 3 and the slide barrier 11 reaches the position shown in FIG. 4 where the slide barrier 11 is closed.

During such a movement, smooth sliding movements of the slide barrier 11 is ensured by the action of respective cam grooves and respective cam followers.

As has been explained heretofore, by skillfully constructing the widths of a plurality of cam grooves and the diameters of the cam followers which are engaged with the cam grooves, the camera of this embodiment ensures smooth manipulation in opening or closing the slide barrier 11, thus remarkably enhancing the usability of the camera.

In this present invention, it is apparent that working modes different in a wide range can be formed on the basis of this present disclosure without departing from the spirit and the scope of the invention. This present invention is therefore not restricted by an specific embodiments described herein except as limited by the appended claim hereto.

What is claimed is:

1. A camera comprising:
   a camera body including
      a picture-taking lens,
      a pair of first cam grooves, and
      a pair of second cam grooves branched from middle portions of the first cam grooves and each second cam groove having a width narrower than a width of a corresponding one of the first cam grooves in such a manner that the first cam grooves and the second cam grooves sandwich the picture-taking lens; and
   a barrier being movable between a position where the barrier covers the picture-taking lens and a position which fully exposes the picture-taking lens, the barrier having a front surface thereof which is coplanar with a front surface of the camera body at the position where the barrier covers the picture-taking lens and which protrudes from the front surface of the camera body at the position which fully exposes the picture-taking lens, the barrier having
      a pair of first cam followers positioned on the barrier such that the first cam followers sandwich the picture-taking lens, and
      a pair of second cam followers each having a diameter narrower than that of a corresponding one of the first cam followers and positioned on the barrier such that the second cam followers sandwich the picture-taking lens,
      the first cam followers being engaged with the first cam grooves and the second cam followers being engaged with the second cam grooves when the barrier is disposed at the position where the barrier covers the picture-taking lens, and
      both the first and second cam followers being engaged with the first cam grooves when the barrier is disposed at the position fully exposing the picture-taking lens.

2. A camera according to claim 1, wherein the cam grooves are formed on an outer portion of the camera body.

3. A camera according to claim 1, wherein one of the pair of first cam grooves is formed on an upper portion of the camera body and the other of the pair of first cam grooves is formed on a lower portion of the camera body, while one of the pair of second cam grooves is formed on the upper portion of the camera body and the other of the pair of second cam grooves is formed on the lower portion of the camera body.

4. A camera according to claim 1, wherein the first cam grooves are comprised of first portions which are formed parallel to a plane which approximately perpendicularly intersects an optical axis of the picture-taking lens and second portions which have directional components in the direction of the optical axis so as to enable the barrier to move to the position where the barrier covers the picture-taking lens, and the second cam grooves are formed parallel to the second portions of the first cam grooves.

5. A camera according to claim 1, wherein the first cam followers are constructed so as to be prevented from engaging the second cam grooves in the course of movement of the barrier between the two positions.

6. A camera according to claim 1, wherein the barrier includes a pair of opposing surfaces in such a manner that the surfaces sandwich the picture-taking lens, one of the pair of the first cam followers and one of the pair of the second cam followers are disposed on one of the opposing surfaces, while the other of the pair of the first cam followers and the other of the pair of the second cam followers are disposed on the other of the opposing surfaces.

7. A camera having a barrier which is movable from a position where the barrier covers a picture-taking lens and a position which fully exposes the picture-taking lens, comprising:
   a camera body including
      first cam grooves, and
      second cam grooves branched from middle portions of the first cam grooves and each second cam groove having a width narrower than a width of a corresponding one of the first cam grooves; and
   a barrier including
      first cam followers, and
      second cam followers each having a diameter narrower than a diameter of a corresponding one of the first cam followers.

8. A camera according to claim 7, wherein the first cam followers are consistently prevented from engaging the second cam grooves in the course of movement of the barrier between the two positions.

9. A camera having a barrier which is movable from a position where the barrier covers a picture-taking lens and a position which fully exposes the picture-taking lens, comprising:
   a camera body including a pair of first cam grooves and a pair of second cam grooves branched from middle portions of the first cam grooves and each second cam groove having a width narrower than a width of a corresponding one of the first cam grooves; and
   a barrier including
      a pair of first cam followers, and
      a pair of second cam followers each having a diameter narrower than a diameter of a corresponding one of the first cam followers,
      the first cam followers being engaged with the first cam grooves and the second cam followers being engaged with the second cam grooves when the barrier is disposed at the position where the barrier covers the picture-taking lens, and
      both the first and second cam followers being engaged with the first cam grooves when the barrier is disposed at the position fully exposing the picture-taking lens.

10. A camera according to claim 9, wherein one of the pair of first cam grooves is formed on an upper portion of the camera body and the other of the pair of first cam grooves is formed on a lower portion of the camera body, while one of the pair of second cam grooves is formed on the upper portion of the camera body and the other of the pair of second cam grooves is formed on the lower portion of the camera body.

11. A camera comprising:
    a camera body including
       the first cam grooves, and
       second cam grooves which are contiguously branched from middle portions of the first cam grooves and each second cam groove having a width narrower than a width of a corresponding one of the first cam grooves; and
    a barrier being movable between a position where the barrier covers a picture-taking lens and a position which fully exposes the picture-taking lens, the barrier including
       first cam followers which are engaged with and come into sliding contact with the first cam grooves, and
       second cam followers which are engaged with and come into sliding contact with the first cam grooves and the second cam grooves, wherein each second cam follower has a diameter narrower than a diameter of a corresponding one of the first cam followers.

12. A camera according to claim 11, wherein portions of the first cam grooves and the second cam grooves are formed so as to position the barrier at a position where the barrier covers the picture-taking lens.

13. A camera according to claim 11, wherein the first cam followers are consistently prevented from engaging the second cam grooves in the course of movement of the barrier between the two positions.

14. A camera comprising:
  a camera body including
    first cam grooves, and
    second cam grooves branched from middle portions of the first cam grooves and each second cam groove having a width narrower than a width of a corresponding one of the first cam grooves; and
  a barrier being movable between a position which fully exposes a picture-taking lens and a position where the barrier covers the picture-taking lens, the barrier including
    first cam followers which are engaged with and come into sliding contact with the first cam grooves, and
    second cam followers each having a diameter narrower than a diameter of a corresponding one of the first cam followers, and being engaged with and coming into sliding contact with the second cam grooves in the course of movement of the barrier between the two positions.

15. A camera comprising:
  a camera body including
    first guiding portions, and
    second guiding portions branched from middle portions of the first guiding portions and each second guiding portion having a width narrower than a width of a corresponding one of the first guiding portions; and
  a barrier being movable between a position which fully exposes a picture-taking lens and a position where the barrier covers the picture-taking lens, the barrier including
    first guided portions which are engaged with and come into sliding contact with the first guiding portions, and
    second guided portions which are engaged with and come into sliding contact with the first guiding portions and are engaged with and come into sliding contact with the second guiding portions in the course of movement of the barrier between the two positions.

16. A camera comprising:
  a camera body including
    a pair of first cam grooves, and
    a pair of second cam grooves which are branched from middle portions of the first cam grooves, each second cam groove having a width narrower than a width of a corresponding one of the first cam grooves; and
  a barrier being movable between a position where the barrier covers a picture-taking leans and a position which fully exposes the picture-taking lens, the barrier having
    a pair of first cam followers which are engaged with and come into sliding contact with a pair of the first cam grooves, and
    a pair of second cam followers each having a diameter narrower than a diameter of a corresponding one of the first cam followers,
    the first cam followers being engaged with the first cam grooves and the second cam followers being engaged with the second cam grooves when the barrier is disposed at the position where the barrier covers the picture-taking lens, and
    both the first and second cam followers being engaged with the first cam grooves when the barrier is disposed at the position which fully exposes the picture-taking lens.

17. A camera comprising:
  a barrier being movable between a position where the barrier covers a picture-taking lens and a position which fully exposes the picture-taking lens, the barrier having first cam followers and second cam followers; and
  a camera body including
    first cam grooves with which the first cam followers and the second cam followers are engaged and come into sliding contact, and
    second cam grooves which are branched from middle portions of the first cam grooves with which the second cam followers are engaged and come into sliding contact, the second cam grooves each having a width narrower than a width of a corresponding one of the first cam grooves in such a manner that the first cam followers are not capable of being engaged with the second cam grooves in the course of movement of the barrier between the two positions.

18. A camera comprising:
  a camera body including
    first cam grooves, and
    second cam grooves which are branched from middle portions of the first cam grooves, the first cam grooves each having a width wider than a width of a corresponding one of the second cam grooves; and
  a barrier being movable from a position which fully exposes a picture-taking lens and a position where the barrier covers the picture-taking lens, the barrier including
    first cam followers which are engaged with and come into sliding contact with the first cam grooves, and
    second cam followers each having a width narrower than a width of a corresponding one of the first cam followers, and being engaged with and coming into sliding contact with the second cam grooves in the course of movement of the barrier between the two positions.

19. A camera according to claim 18, wherein the first cam followers are blocked from entering entrances of the second cam grooves in the course of the movement thereof to thereby bypass the entrances.

20. A camera comprising:
  a camera body including
    one first cam groove, and
    a second cam groove which is branched from a middle portion of the first cam groove, the second cam groove having a width narrower than a width of the first cam groove; and
  a barrier being movable from a position which fully exposes a picture-taking lens and a position where the barrier covers the picture-taking lens, and the barrier including
    a first cam follower which is engaged with and comes into sliding contact with the first cam grooves; and
    a second cam follower having a diameter narrower than a diameter of the first cam follower which is engaged with and comes into sliding contact with the first cam groove, wherein a movement of the second cam follower trails a movement of the first cam follower and is engaged with and comes into contact with the second cam groove in the course of movement of the barrier between the two positions.

* * * * *